United States Patent
Maekawa

(10) Patent No.: US 9,498,863 B2
(45) Date of Patent: Nov. 22, 2016

(54) MACHINE TOOL INCLUDING COOLANT APPARATUS

(71) Applicant: FANUC Corporation, Yamanashi (JP)

(72) Inventor: Susumu Maekawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 205 days.

(21) Appl. No.: 14/332,719

(22) Filed: Jul. 16, 2014

(65) Prior Publication Data

US 2015/0025673 A1 Jan. 22, 2015

(30) Foreign Application Priority Data

Jul. 17, 2013 (JP) ................................. 2013-148630

(51) Int. Cl.
*G06F 19/00* (2011.01)
*B23Q 11/00* (2006.01)
*B23Q 11/10* (2006.01)

(52) U.S. Cl.
CPC .......... *B23Q 11/0075* (2013.01); *B23Q 11/10* (2013.01); *B23Q 11/1046* (2013.01)

(58) Field of Classification Search
CPC .......... B23Q 11/0075; B23Q 11/1046; B23Q 11/10
USPC .............................. 700/175; 408/56; 123/497
See application file for complete search history.

(56) References Cited

U.S. PATENT DOCUMENTS

| | | | | |
|---|---|---|---|---|
| 2,559,614 A | * | 7/1951 | Hapman | B01D 35/16 198/716 |
| 2,917,874 A | * | 12/1959 | Lierse | B24B 47/06 451/213 |
| 4,977,529 A | * | 12/1990 | Gregg | G09B 9/00 376/245 |
| 5,384,714 A | * | 1/1995 | Kidd | G01M 3/2892 374/4 |
| 5,505,180 A | * | 4/1996 | Otterman | F02D 41/2464 123/497 |
| 5,897,430 A | | 4/1999 | Haller | |
| 2002/0081167 A1 | * | 6/2002 | Sasanecki | B23Q 1/0018 408/56 |
| 2011/0202166 A1 | | 8/2011 | Bornemann et al. | |

FOREIGN PATENT DOCUMENTS

| | | |
|---|---|---|
| CN | 102848260 A | 1/2013 |
| CN | 102896552 A | 1/2013 |
| DE | 4403327 A1 | 8/1995 |
| DE | 29517783 U1 | 1/1996 |
| DE | 102010001518 A1 | 8/2011 |
| JP | 1-148254 U | 10/1989 |
| JP | 4-102754 U | 9/1992 |
| JP | 6-33640 U | 5/1994 |

(Continued)

OTHER PUBLICATIONS

Office Action mailed Sep. 30, 2014, corresponding to Japanese patent application No. 2013-148630.

(Continued)

*Primary Examiner* — Mohammad Ali
*Assistant Examiner* — Ziaul Karim
(74) *Attorney, Agent, or Firm* — Hauptman Ham, LLP

(57) ABSTRACT

A coolant apparatus of a machine tool includes a coolant pump that sends out a coolant from a coolant tank, a controller that drives or stops the coolant pump, and a condition setting unit that sets conditions for driving or stopping the coolant pump. Then, the controller drives or stops the coolant pump based on content set by the condition setting unit.

1 Claim, 4 Drawing Sheets

(56) References Cited

FOREIGN PATENT DOCUMENTS

| | | |
|---|---|---|
| JP | 7-185993 A | 7/1995 |
| JP | 2005-131762 A | 5/2005 |
| JP | 2011-31341 A | 2/2011 |
| JP | 2013-13968 A | 1/2013 |

OTHER PUBLICATIONS

Office Action dated Jun. 26, 2015, corresponding to Chinese patent application No. 201410337633.1.
Office Action in DE Application No. 102014109813.7, dated Feb. 15, 2016.

* cited by examiner

| COOLANT PUMP | DRIVE CONDITIONS | STOP CONDITIONS | RE-DRIVE WHEN DOOR CLOSED |
|---|---|---|---|
| A | ·CYCLE START | ·DOOR OPENED<br>·MACHINING FINISHED | ·NO |
| B | ·CYCLE START | ·DOOR OPENED | ·YES |
| C | ·POWER-ON | ·NONE | — |

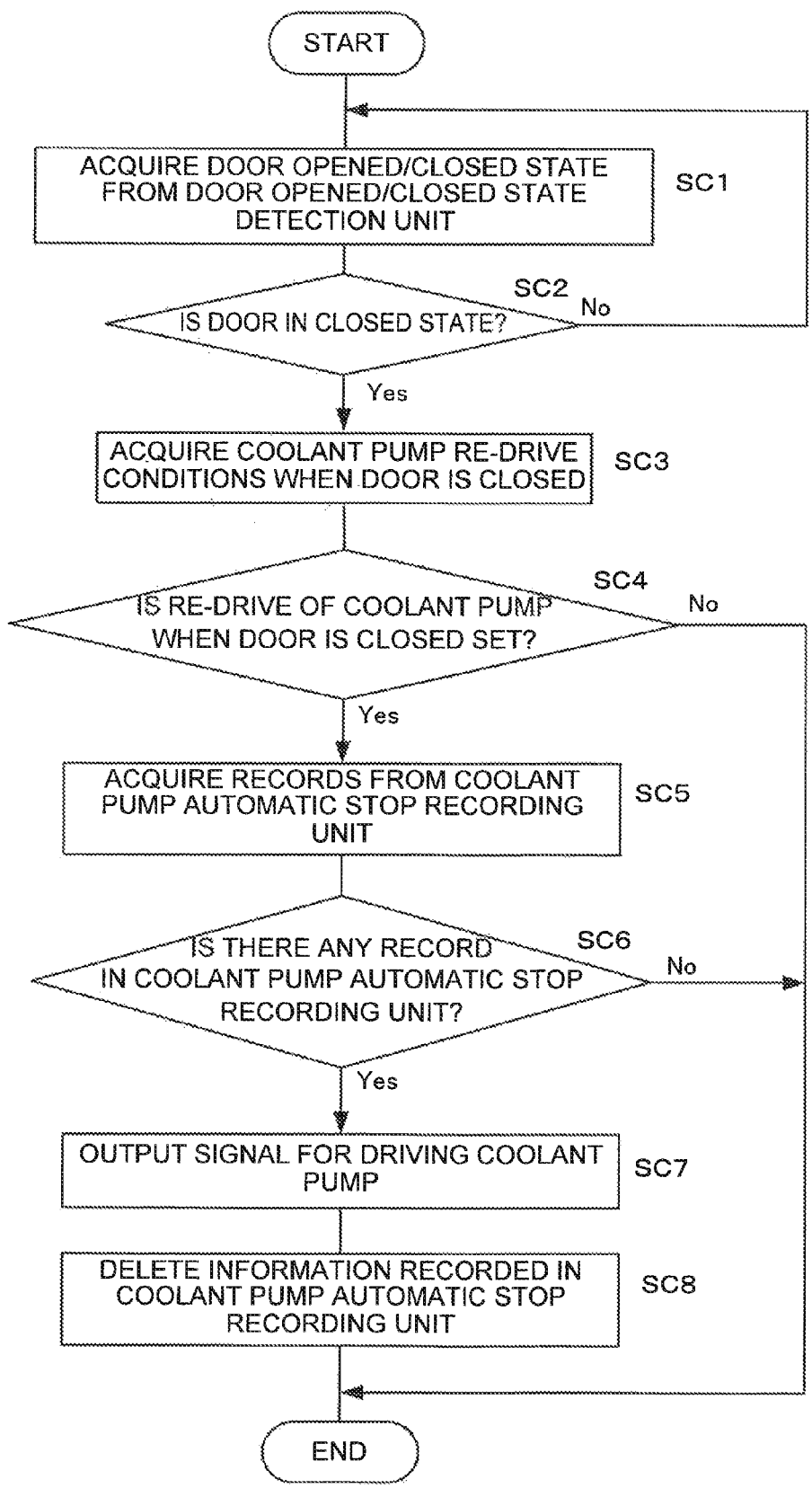

MACHINE TOOL INCLUDING COOLANT APPARATUS

RELATED APPLICATIONS

The present application claims priority to Japanese Application Number 2013-148630, filed Jul. 17, 2013, the disclosure of which is hereby incorporated by reference herein in its entirety.

BACKGROUND OF THE INVENTION

Field of the Invention

The present invention relates to a machine tool including a coolant apparatus.

Description of the Related Art

Chips generated during machining in a machine tool may accumulate by adhering to various locations around a workpiece or inside a cover put over a machining region. When chips accumulate as described above, accuracy of machining may deteriorate or the machine tool may not work normally and therefore, it is necessary to remove and discharge chips out of the machine. To remove chips accumulated inside the machine tool, a nozzle or the like that supplies a coolant to each location inside the cover put over a machining region is generally provided and the coolant is used to wash away chips.

To supply a coolant, methods such as laying a pipe for coolant supply inside an apparatus and causing an external nozzle to discharge the coolant toward a machine tool are known.

Japanese Patent Application Laid-Open No. 2005-131762 discloses a technology that provides an opening in a wall portion of a machine tool without laying a pipe inside an apparatus of the machine tool and causes the coolant to be discharged along a wall surface from an inner wall itself of the machine tool through the opening. The technology causes the coolant to pass through an opening provided in the wall portion so that the coolant is discharged along the wall surface from the inner wall itself, not from the pipe laid inside the machine. Accordingly, chips adhering and accumulating on the sidewall or at the bottom inside the machine can effectively be discharged. However, how to discharge or stop the coolant is not shown.

It is a common practice to remove chips by discharging the coolant during machining based on a command such as an M code instructed in a machining program or input from an operation panel or the like and to stop discharging the coolant when machining is finished. However, when the coolant is discharged or stopped based on a command such as an M code instructed in a machining program or input from an operation panel or the like and the discharge of the coolant is stopped when machining is finished, chips may not be completely removed when machining is finished so that chips may remain inside the machine without being completely removed.

On the other hand, when the discharge of the coolant is continued after machining is finished such as keeping discharging the coolant all the time to remove chips, power is consumed unnecessarily and there is also the possibility of the coolant splattering out of the machine when a door provided in the cover is opened. When the coolant is splattered on a floor, the floor may become more slippery and incur a danger.

SUMMARY OF THE INVENTION

An object of the present invention is to provide a machine tool capable of discharging or stopping a coolant efficiently and safely to remove chips.

In a machine tool including a coolant apparatus according to the present invention, the coolant apparatus includes a coolant tank that stores a coolant, a coolant pump that sends out the coolant from the coolant tank, a coolant pump controller that drives or stops the coolant pump, a discharge unit to discharge the coolant supplied from the coolant pump, and a coolant pump drive/stop condition setting unit that sets conditions for driving or stopping the coolant pump. Further, the coolant pump controller is configured to drive or stop the coolant pump based on content set by the coolant pump drive/stop condition setting unit.

In a machine tool including a coolant apparatus according to the present invention, the coolant pump is controlled to be driven or stopped based on content set by the coolant pump drive/stop condition setting unit and thus, the coolant can be discharged or stopped in appropriate timing not only by control based on a command in a machining program or an operation from an operation pump, but also by content set by the coolant pump drive/stop condition setting unit. Therefore, chips can effectively be removed while power consumption being curbed.

The coolant apparatus further may include a door opened/closed state detection unit that detects an opened/closed state of a door provided in the machine tool, the coolant pump drive/stop condition setting unit may contain the opened/closed state of the door as a condition, and the coolant pump controller may be configured to drive or stop the coolant pump based on a detection signal from the door opened/closed state detection unit.

In this embodiment, control is carried out in a situation where the opened/closed state of the door provided in the machine tool is contained in coolant pump drive/stop conditions so that opening/closing of the door and the drive and stop of the coolant pump can be associated with each other and splattering of the coolant to the outside when the door is opened can be prevented.

The coolant pump controller may be configured to output a signal to stop the coolant pump when the door is determined to be in an opened state based on the detection signal from the door opened/closed state detection unit.

In this embodiment, the coolant pump is stopped when the door is determined to be in an opened state, and therefore, dangers of the coolant splattering out of the machine and making the floor slippery when the door is opened, which could occur when drive of the coolant pump is continuing, can be avoided.

The coolant apparatus may further include a coolant pump automatic stop recording unit that records, when the coolant pump controller determines that the door is in the opened state based on the detection signal from the door opened/closed state detection unit and outputs the signal to stop the coolant pump, the output of the signal.

In this embodiment, when the door is determined to be in the opened state and the coolant pump is stopped, the stop of the coolant pump is recorded in the coolant pump automatic stop recording unit and therefore, when the door is closed thereafter, subsequent control can be executed based on records made in the automatic stop recording unit.

The coolant pump controller may be configured, when the door is determined to be in a closed state based on the detection signal from the door opened/closed state detection unit, to output a signal to drive the coolant pump by referring to the content recorded by the coolant pump automatic stop recording unit.

In this embodiment, when the stop is recorded in the coolant pump automatic stop recording unit, a signal to drive the coolant pump is output when the door is determined to be in a closed state thereafter based on the detection signal from the door opened/closed state detection unit. Therefore, when the coolant pump is stopped by the door being opened while the coolant pump is driven, the drive of the coolant pump can be restarted when the door is closed thereafter.

According to the present invention, a machine tool capable of discharging or stopping a coolant efficiently and safely to remove chips can be provided.

BRIEF DESCRIPTION OF THE DRAWINGS

The above object and other objects and features of the present invention will be apparent from the description of the following embodiment with reference to appended drawings. Among these drawings:

FIG. 5 is a flow chart of coolant pump control when the door is closed.

DETAILED DESCRIPTION OF THE PREFERRED EMBODIMENTS

The cabinet of a machine tool is configured by an apparatus cover or the like and the machine tool is configured such that chips outside and inside the machine tool are removed by providing a pipe or a duct outside or inside the machine tool and supplying a coolant thereto.

Figures 1, 2:
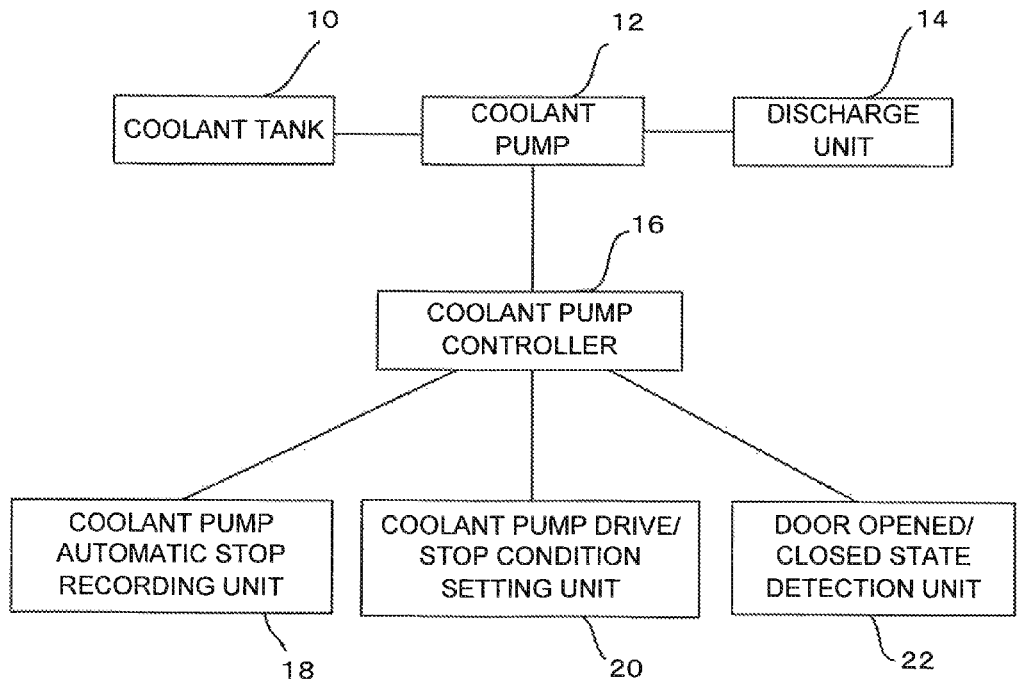
FIG. 1 is a block diagram showing a relationship between a coolant pump and a control unit of the coolant pump constituting a machine tool according to the present invention.
FIG. 2 is a diagram showing setting examples of conditions for driving and stopping the coolant pump set to a coolant pump drive/stop condition setting unit.

FIG. 1 is a block diagram showing a relationship between a coolant pump 12 and a control unit of the coolant pump 12.

A coolant is stored in a coolant tank 10. The coolant sucked up by the coolant pump 12 is discharged to each location by a discharge unit 14. Though FIG. 1 shows only one unit of the coolant pump 12 and only one unit of the discharge unit 14, a plurality of units of the coolant pump 12 or the discharge unit 14 may be included, as necessary. For example, a coolant pump 12 and a discharge unit 14 intended for lubricating or cooling a tool and workpiece, a coolant pump 12 and a discharge unit 14 intended for removing chips around workpieces generated by machining, or a coolant pump 12 and a discharge unit 14 intended for washing away chips adhering to a sidewall portion inside the cover put over a machining region may be provoved.

In addition, a coolant pump controller 16 that controls the drive and stop of the coolant pump 12 is connected to the coolant pump 12. A coolant pump automatic stop recording unit 18, a coolant pump drive/stop condition setting unit 20, and a door opened/closed state detection unit 22 are connected to the coolant pump controller 16.

When conditions for discharging a coolant set by a command such as an M code instructed in a machining program or input from an operation panel or the like are satisfied, the coolant pump controller 16 outputs a signal that drives the coolant pump 12 and drives the coolant pump 12 to discharge the coolant from the discharge unit 14. When conditions for stopping the discharge of the coolant set by a command such as an M code instructed in a machining program or input from an operation panel or the like are satisfied, the coolant pump controller 16 outputs a signal that stops the coolant pump 12 and stops the coolant pump 12 to stop the discharge of the coolant.

In the present embodiment, conditions for driving or stopping the coolant pump 12 are set not only by a command such as an M code instructed in a machining program or input from an operation panel or the like, but also by the coolant pump drive/stop condition setting unit 20 to control the drive or stop of the coolant pump 12 according to the set conditions. The door opened/closed state detection unit 22 detects the opened or closed state of the door of a machine tool and uses the detection result as a condition for driving or stopping the coolant pump 12 in the coolant pump drive/stop condition setting unit 20.

FIG. 2 is a diagram showing setting examples of drive and stop conditions of the coolant pump 12 set to the coolant pump drive/stop condition setting unit 20.

In the coolant pump drive/stop condition setting unit 20, setting of control conditions other than instruction of a command such as an M code specified in a machining program or input from an operation panel or the like is performed. In the example shown in FIG. 2, a coolant pump A is driven by a cycle start and when the door is opened or machining is finished, the drive of the coolant pump A is stopped. Not to drive the coolant pump A again when the door is closed is set, therefore, after the door is once opened and drive of the coolant pump A is stopped, the coolant pump A will not be driven again even if the door is closed at a later time (drive of the coolant pump is performed again at the start of the next cycle).

A coolant pump B is driven by the cycle start and when the door is opened, the drive of the coolant pump B is stopped. It is set to drive again the coolant pump B which has been hitherto stopped if the door is opened is set. Therefore, if the door is closed after the door is once opened and the drive of the coolant pump B is stopped, the coolant pump 12 is driven again.

A coolant pump C is driven at power-on. There is nothing other than a command such as an M code specified in a machining program or input from an operation panel or the like that stops the coolant pump C driven at the time of power-on (that is, even if the door is opened, the drive of the coolant pump C is not stopped). Therefore, as a matter of course, setting of any drive/stop condition when the door is closed is not made.

In the example of FIG. 2, mutually different drive conditions and stop conditions are set to the three coolant pumps A, B, C, but still other drive/stop conditions may be set to other coolant pumps 12, or conversely, the same drive/stop conditions may be set to a plurality of the coolant pumps 12.

Figure 3:
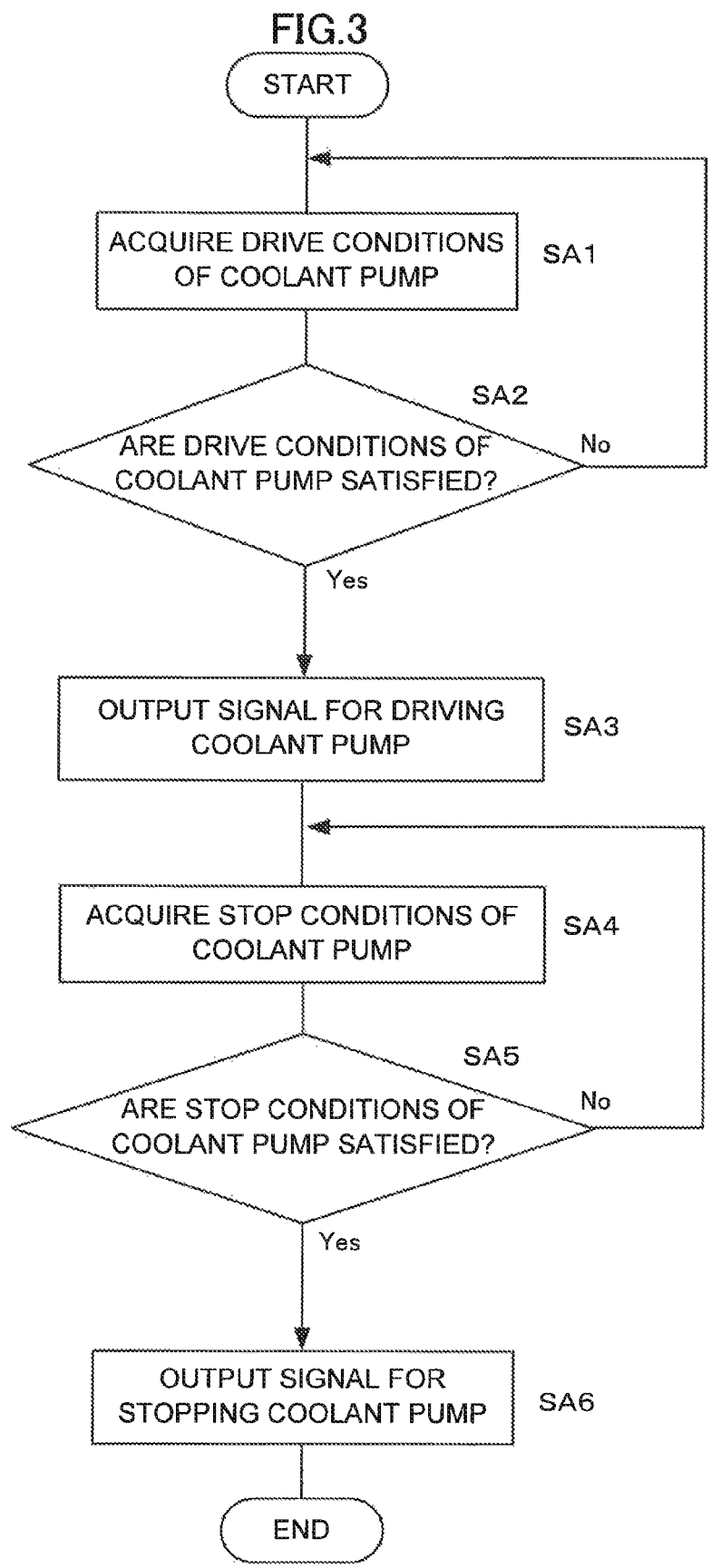
FIG. 3 is a flow chart of coolant pump control processing to drive or stop the coolant pump using the set coolant pump driving/stopping conditions.

Processing of the coolant pump controller 16 that drives or stops the coolant pump 12 by using conditions set in the coolant pump drive/stop condition setting unit 20 will be described by using the flowchart in FIG. 3. Each step thereof will be described below.

[Step SA1] Drive conditions for the coolant pump 12 stored in the coolant pump drive/stop condition setting unit 20 are acquired.

[Step SA2] It is determined whether or not the current state satisfies the drive conditions for the coolant pump 12 acquired in Step SA1. If the current state satisfies the drive conditions (Yes), the process proceeds to Step SA3. If the current state does not satisfies the drive conditions (No), the process proceeds to Step SA1.

[Step SA3] A signal that drives the coolant pump 12 is output to drive the coolant pump 12.
[Step SA4] Stop conditions for the coolant pump 12 stored in the coolant pump drive/stop condition setting unit 20 is acquired.
[Step SA5] It is determined whether or not the current state satisfies the stop conditions for the coolant pump 12 acquired in Step SA4. If the current state satisfies the stop conditions (Yes), the process proceeds to Step SA6. If the current state does not satisfy the stop conditions (No), the process proceeds to Step SA4.
[Step SA6] A signal for stopping the coolant pump 12 is output to stop the drive of the coolant pump 12, and the process is ended.

Next, processing to drive or stop the coolant pump 12 based on the door opened/closed state will be described.

Figure 4:
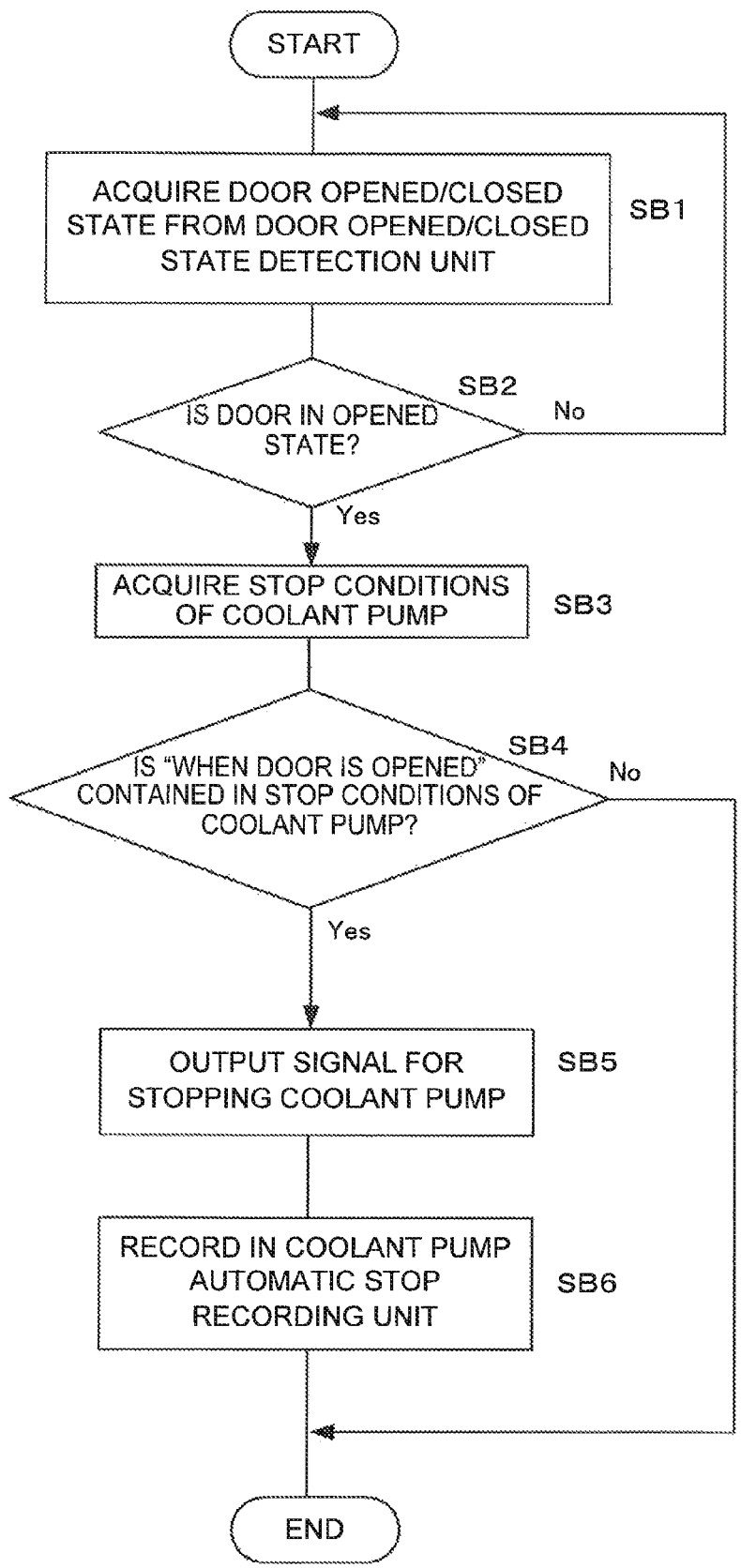
FIG. 4 is a flow chart of processing to drive or stop the coolant pump when a door is opened while the coolant pump is driven (while the coolant is discharged)

FIG. 4 is a flow chart of processing to drive or stop the coolant pump when a door is opened while the coolant pump is driven (while the coolant is discharged).
[Step SB1] The door opened/closed state is acquired from the door opened/closed state detection unit 22.
[Step SB2] It is determine whether the door is in an opened state or not. If the door is in an opened state (Yes), the process proceeds to step SB3. If the door is in a closed state (No), the process proceeds to step SB1.
[Step SB3] Stop conditions for the coolant pump 12 stored in the coolant pump drive/stop condition setting unit 20 are acquired.
[Step SB4] It is determined whether "when the door is opened" is contained in stop conditions for the coolant pump 12 acquired in Step SB3. If "when the door is opened" is contained (yes), the process proceeds to Step SB5. If "when the door is opened" is not contained (No), the process is ended.
[Step SB5] A signal for stopping the coolant pump 12 is output to stop the drive of the coolant pump 12.
[Step SB6] The fact that the coolant pump 12 was stopped because "the door was opened" is recorded in the coolant pump automatic stop recording unit 18.

The reason that output of a signal for stopping the coolant pump 12 is recorded in the coolant pump automatic stop recording unit 18 in step SB6 is that the coolant pump 12 is driven again when the door is closed, as described below, only if the door is opened and then the drive of the coolant pump 12 is stopped.

FIG. 5 is a flow chart of coolant pump control processing when the door is closed. Each step thereof will be described below.
[Step SC1] The door opened/closed state is acquired from the door opened/closed state detection unit 22.
[Step SC2] It is determined whether the door is in a closed state or not. If the door is in a closed state (Yes), the process proceeds to Step SC3. If the door is in an opened (No), the process returns to Step SC1.
[Step SC3] Re-drive conditions for the coolant pump 12 when the door is closed, stored in the coolant pump drive/stop condition setting unit 20, are acquired.
[Step SC4] It is determined whether or not the re-drive conditions acquired in Step SC3 contains setting of a re-drive of the coolant pump 12 when the door is closed. If setting of such a re-drive is contained (Yes), the process proceeds to Step SC5. If setting of such a re-drive is not contained (No), the process is ended.
[Step SC5] Records are acquired from the coolant pump automatic stop recording unit 18.
[Step SC6] It is determined whether or not the records acquired in step SC5 contain a record of the fact that the coolant pump 12 was stopped because the door was opened. If such a record is contained (Yes), the process proceeds to step SC7. If such a record is not contained (No), the process is ended.
[Step SC7] A signal for driving the coolant pump 12 is output so that the coolant pump 12 is driven.
[Step SC8] The record of the fact that the coolant pump 12 was stopped because the door was opened, which has been recorded in the coolant pump automatic stop recording unit 18, is deleted.

According to the embodiment described above, an opened/closed state of the door is detected, and then, based on the detected opened/closed state of the door, the drive or stop of the coolant pump 12 is controlled. However, the present invention is not limited to such setting; the drive or stop of the coolant pump 12 may be controlled on the basis of other operations of an operator or the like. Further, according to the embodiment described above, with the setting of re-drive of the coolant pump when the door is closed, if the drive of the coolant pump is stopped because the door is opened, then the drive of the coolant pump is performed again when the door is closed. However, the coolant pump may be configured not to be driven again when the door is closed, without the setting of re-drive of the coolant pump when the door is opened. Alternatively, setting may be made such that, if the drive of the coolant pump 12 is stopped because the door is opened, the re-drive of the coolant pump is always performed when the door is closed.

The invention claimed is:
1. A machine tool including a coolant apparatus, the coolant apparatus comprising:
    a coolant tank configured to store a coolant;
    a coolant pump configured to send out the coolant from the coolant tank;
    a coolant pump controller configured to drive and stop the coolant pump;
    a discharge unit configured to discharge the coolant supplied from the coolant pump;
    a coolant pump drive/stop condition setting unit configured to set conditions for driving or stopping the coolant pump;
    a door opened/closed state detection unit configured to detect an opened state and a closed state of a door provided in the machine tool; and
    a coolant pump automatic stop recording unit configured to
        determine, based on a detection signal from the door opened/closed state detection unit, that the door is in the opened state, and
        record output of a stop signal to stop the coolant pump,
    wherein the coolant pump controller is configured to
        drive or stop the coolant pump based on content set by the coolant pump drive/stop condition setting unit and the detection signal from the door opened/closed state detection unit, and output the stop signal to stop the coolant pump when the door is determined to be in the opened state based on the detection signal from the door opened/closed state detection unit,
    wherein, when (i) the output of the stop signal is recorded in the coolant pump automatic stop recording unit and (ii) the door is determined to be in the closed state based on the detection signal from the door opened/closed state detection unit,
        the coolant pump controller is configured to
            output a drive signal to re-drive the stopped coolant pump, and delete the record of the output of the stop signal in the coolant PUMP automatic stop recording unit, and wherein, when (a) the output of the stop signal is not recorded in the coolant pump automatic stop recording unit and (b) the door is determined to be in the closed state based on the detection signal from the door opened/closed state detection unit, the coolant pump controller is configured to not output the drive signal.

* * * * *